(12) United States Patent
He et al.

(10) Patent No.: US 9,618,192 B2
(45) Date of Patent: Apr. 11, 2017

(54) SMALL-SPACING LED SCREEN

(71) Applicant: UNILU-MIN GROUP CO., LTD, Guang-dong (CN)

(72) Inventors: Jinfeng He, Shenzhen (CN); Hongbo Ma, Shenzhen (CN); Yunfeng Li, Shenzhen (CN)

( * ) Notice: Subject to any disclaimer, the term of this patent is extended or adjusted under 35 U.S.C. 154(b) by 0 days.

(21) Appl. No.: 14/379,939

(22) PCT Filed: May 29, 2014

(86) PCT No.: PCT/CN2014/078775
§ 371 (c)(1),
(2) Date: Aug. 20, 2014

(87) PCT Pub. No.: WO2015/158029
PCT Pub. Date: Oct. 22, 2015

(65) Prior Publication Data
US 2017/0023215 A1    Jan. 26, 2017

(30) Foreign Application Priority Data

Apr. 18, 2014 (CN) .......................... 2014 1 0158193

(51) Int. Cl.
| *F21V 9/00* | (2015.01) |
| *F21V 19/00* | (2006.01) |
| *F21V 11/06* | (2006.01) |
| *F21V 29/83* | (2015.01) |
| *F21V 23/00* | (2015.01) |
| *F21Y 115/10* | (2016.01) |
| *F21Y 105/16* | (2016.01) |

(52) U.S. Cl.
CPC ............ *F21V 19/003* (2013.01); *F21V 11/06* (2013.01); *F21V 23/003* (2013.01); *F21V 29/83* (2015.01); *F21Y 2105/16* (2016.08); *F21Y 2115/10* (2016.08)

(58) Field of Classification Search
CPC ............................. G02B 6/0068; G02B 6/002
See application file for complete search history.

(56) References Cited

U.S. PATENT DOCUMENTS

2008/0112162 A1*  5/2008  Chan ................. G02F 1/133603
                                                    362/230

\* cited by examiner

*Primary Examiner* — Elmito Breval

(57) ABSTRACT

A small-spacing LED screen is provided, comprising a bottom case, an HUB board arranged on one side of the bottom case, and a small module arranged on the other side and electrically connected with the HUB board. The small module includes a module main body and a drive control unit which is electrically connected with the module main body to drive and control the module main body. An adaptor plate is also arranged between the small module and the HUB board. The HUB board is electrically connected with the adaptor plate. The drive control unit is arranged on the adaptor plate. The LED screen has the smallest spacing, and the reject ratio of the small module is greatly reduced.

7 Claims, 1 Drawing Sheet

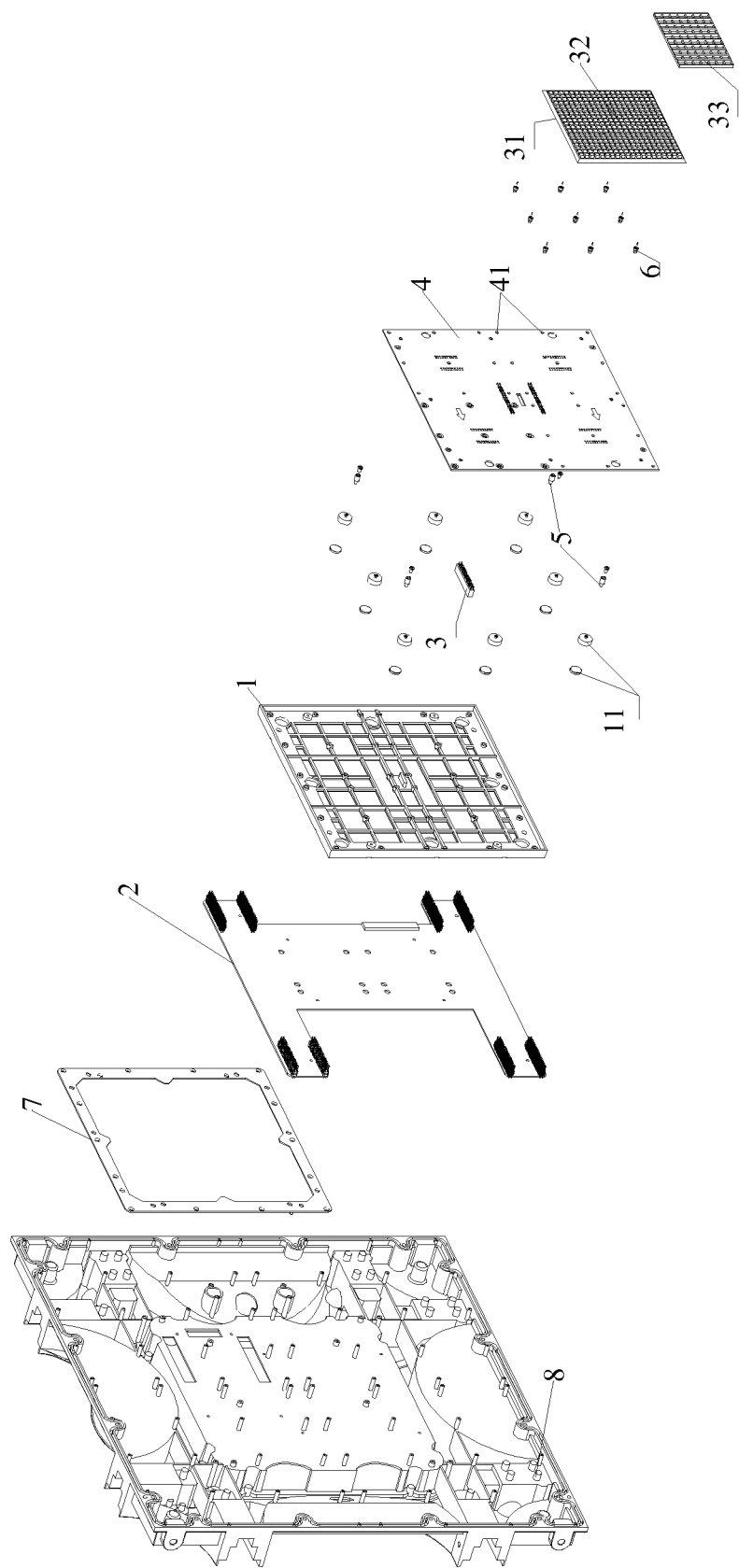

SMALL-SPACING LED SCREEN

FIELD OF THE INVENTION

The invention relates to the field of image display equipment, in particular to a small-spacing LED screen.

DESCRIPTION OF THE PRIOR ART

LED screens have the advantages of low power consumption, long service life, low cost, high luminance, large view angle, long visibility distance, etc., can meet the demands of different application sites, and are universally acknowledged as the display equipment with the most potential and fastest development speed. For LED screens, the smaller the distance between pixels is, the higher the pixel density in a unit area is. This means that more pixels can participate in the image change on the side boundary. When the display area is fixed, the higher the pixel density is, the higher the reduction degree of pictures on the screen is and the clearer the displayed image is. To display a relatively exquisite image, screens are required to be big enough to reach the full-screen pixels required by the high-definition image. The structure of existing LED screens are all as follows: a large screen light panel together with an HUB board is directly connected to the computer controller; the front of the screen module is a lamp body; and the back is a drive control unit for driving and controlling the lamp body to light up; and the drive control unit comprises a drive IC, a capacitor, a resistor and pin header, female header, a nut, etc. connected to the controller. Theoretically, the smaller the inter-screen spacing is, the more driving electronic components are required and the bigger the density is. To arrange more components, usually a large lamp pane area is required, resulting in inconvenient manufacture and production of the screen modules and causing low yield during manufacture. If the lamp panel area is set in a certain scope, increasing the number of components on the reverse side of the lamp panel will directly lead to increase in production cost and maintenance cost.

BRIEF SUMMARY OF THE INVENTION

The technical problem to be solved in the invention is to provide a small-spacing LED screen with smaller spacing and higher yield.

To solve the technical problem, the invention provides a technical solution: a small-spacing LED screen is provided, comprising a bottom case, an HUB board arranged on one side of the bottom case and small modules arranged on the other side and electrically connected with the HUB board. Each small module comprises a module main body and a drive control unit which is electrically connected with the module main body to drive and control the module main body. An adaptor plate is arranged between the small modules and the HUB board. The HUB board is electrically connected with the adaptor plate. The drive control unit is arranged on the adaptor plate.

The invention has the following beneficial effects: different from the prior art, the adaptor plate is additionally arranged between the HUB board and the small modules, and the drive control units in the small modules are fixedly connected to the adaptor plate and then connected with the HUB board; compared with the prior art in which the adaptor plate is directly fixed on the side of the small modules, the structure of the invention can minimize components such as the drive control unit on the side of the small modules so as to reduce the area of the small modules instead of reserving a large area for arrangement of the components, thus minimizing the spacing of the LED screen. In addition, the structure has a small spacing; surface mounting of the lamp bodies is more precise compared with other manufacturing process; the production process is relatively strict; and the reject ratio of the small modules is greatly reduced.

Moreover, compared with the prior structure, the small module greatly reduces the research and development cycle of products, is conveniently maintained, and has relatively low maintenance cost in comparison with the LED screen in the prior art. In the invention, to repair the small modules, only those with default are required to be removed. In case of beyond repair and replacement needed, theoretically, the cost only accounts for a very small part of that in the past.

DESCRIPTION OF THE DRAWINGS

FIG. 1 is an exploded view of the structure in a preferable embodiment of the invention.

DESCRIPTION OF REFERENCE NUMBERS

1. Bottom case;
11. Magnet base;
2. HUB board;
3. Module female header;
31. PCB;
32. Lamp body
33 Mask;
4. Adaptor plate;
41. Connecting hole;
5. Second location column;
6. First location column;
7. Bracket;
8. Box.

DETAILED DESCRIPTION OF THE INVENTION

The technical contents, structural features, objective and effects of the invention are described in detail with reference to embodiments and attached drawings. Different from the prior art, an adaptor plate 4 is arranged between the small module and the HUB board 2. The HUB board is electrically connected with the adaptor plate. A drive control unit is arranged on the adaptor plate 4. The LED screen of the invention has a smaller spacing and a higher yield.

As shown in FIG. 1, a small-spacing LED screen comprises a bottom case 1, an HUB board 2 arranged on one side of the bottom case 1 and small modules arranged on the other side and electrically connected with the HUB board 2. Each small module includes a module main body and a drive control unit which is electrically connected with the module main body to drive and control the module main body. An adaptor plate 4 is also arranged between the small modules and the HUB board 2. The HUB board 2 is electrically connected with the adaptor plate 4. The drive control unit is arranged on the adaptor plate. Multiple small modules are jointed. The drive control unit is arranged on the adaptor plate 4.

According to the invention, the adaptor plate 4 is additionally arranged between the HUB board 2 and the small modules, and the drive control units in the small modules are fixedly connected to the adaptor plate 4. Of course, all or part of the drive control units are connected. In case only a part of the drive control units can be arranged, some can be located on the adaptor plate and then connected with the HUB board 2. Compared with the prior art in which the drive control units are directly fixed on two sides of the small modules, this structure can ensure that the sides of the small modules are provided with minimum components such as the drive control units so as to reduce the area of the modules. It is not needed to design a relatively large area for arrangement of the components, thus minimizing the spacing of the LED screen. In addition, the structure has a small spacing; surface mounting of the lamp bodies 32 is more precise compared with other manufacturing process; the production process is relatively strict; and the reject ratio of the small modules is greatly reduced. Moreover, compared with the prior structure, the small module greatly reduces the research and development cycle of products is conveniently maintained, and has relatively low maintenance cost in comparison with the LED screen in the prior art. In the invention, to repair the small modules, only those with default are required to be removed. In cases beyond repair and where replacement is needed, theoretically, the cost only accounts for a very small part of that in the past.

Furthermore, to strengthen connection between the HUB board and the adaptor plate and reduce disorder of wiring and facilitate maintenance, the HUB board 2 is provided with a module pin header, and the adaptor plate 4 is provided with a module female header 3 for connection with the module pin header of the HUB board 2. Each module main body comprises a PCB 31, a plurality of lamp bodies on the PCB 31 and masks 33 covering the lamp bodies 32. The lamp bodies 32 are arranged on the PCB 31 in an array. The lamp shades are strip-shaped or customized for lamp bodies 32. The PCB 31 is formed with a screw hole. The adaptor plate 4 is formed with a connecting hole 41, and the connecting hole 41 is correspondingly provided with a first location column 6 and a screw. The first location column 6 is corresponding to the screw and fixes the PCB 31 on the adaptor plate 4. The PCB 31 is also provided with a female header; the adaptor plate 4 is provided with a pin header; and the pin header is connected with the female header. In this embodiment, the first location column 6 is copper column. The copper column features easily processing, etc. The first location column 6 used for connection can effectively increase the space for arrangement of the drive control unit between the PCB 31 and the adaptor plate 4 and also can effectively strengthen flow of air between the PCB 31 and the adaptor plate 4 and facilitate heat dissipation.

To further increase the connection strength and promote heat dissipation between the adaptor plate 4 and the bottom case 1, the adaptor plate 4 is also formed with a second screw hole, and the bottom case 1 is provided with a corresponding second location column 5. The adaptor plate 4 and the bottom case 1 are fixedly connected through the second screw hole and the second location column 5.

In this embodiment, four small modules 3 are available, joined mutually; four groups of connecting holes 41 are formed on the adaptor plate 4, arranged in an array, and each corresponding to the first screw hole on the PCB 31.

To facilitate connection between the entire assembled device and the LED screen box 8 and realize quick installation and dismantling, the bottom case 1 is also provided with a magnet base 11. The bottom case 1 is fixedly connected with the bracket 7 and then absorbed to the box 8 through the magnet base 11. Of course, the box 8 can also be provided with a magnetic piece corresponding to the magnet base 11.

In conclusion, the adaptor plate 4 is additionally arranged between the HUB board 2 and the small modules and the drive control units in the small modules are fixedly connected to the adaptor plate 4 and then connected with the HUB board 2. Compared with the prior art in which the adaptor plate is directly fixed on the side of the small modules, the structure of the invention can minimize components such as the drive control units on the side of the small modules so as to reduce the area of the small modules. It is not needed to design a large area for arrangement of the components, thus minimizing the spacing of the LED screen. In addition, the structure has a small spacing; surface mounting of the lamp bodies 32 is more precise compared with other manufacturing process; the production process is relatively strict; and the reject ratio of the small modules is greatly reduced. In this base, to strengthen the heat dissipation effect, the first location column 6 and the second location column 5 are respectively used to partition the adaptor plate 4 and the small modules and to partition the adaptor plate 4 and the bottom case 1, thus promoting heat dissipation.

Meanwhile, the connection structure formed by the first location column 6 can also effectively increase the space for arrangement of the drive control units. In this structure, a module pin header and a module female header 3 can be further arranged to effectively strengthen internal connection, thus avoiding disorder of wiring and facilitate maintenance in future.

The above are only the exemplary embodiment of the present invention, which cannot limit the present invention. Within the spirit and principle of the present invention, any modification of the equivalent structure or equivalent flow, or direct or indirect application in other related technical fields all shall be fall in the protection scope of the present invention.

What is claimed is:

1. A small-spacing LED screen, comprising a bottom case, an HUB board arranged on one side of the bottom case and small modules arranged on the other side and electrically connected with the HUB board, wherein each small module includes a module main body and a drive control unit which is electrically connected with the module main body to drive and control the module main body; an adaptor plate is also arranged between the small modules and the HUB board; the HUB board is electrically connected with the adaptor plate; and the drive control unit is arranged on the adaptor plate.

2. The small-spacing LED screen according to claim 1, characterized in that the HUB board is provided with a module pin header, and the adaptor plate is provided with a module female header for connection with the module pin header of the HUB board.

3. The small-spacing LED screen according to claim 1, characterized in that the module main body comprises a PCB, a plurality of lamp bodies arranged on the PCB and a lamp shade covering the lamp bodies.

4. The small-spacing LED screen according to claim 3, characterized in that the PCB is formed with a first screw hole; the adaptor plate is formed with a connecting hole which is correspondingly provided with a first location column and a location pin; the first location column is corresponding to the first screw hole and the PCB is fixed on the adaptor plate through the location pin; the PCB is provided with a female header; the adaptor plate is provided with a pin header on one side corresponding to the PCB; and the pin header is connected with the female header.

5. The small-spacing LED screen according to claim 1, characterized in that the adaptor plate is also provided with a second screw hole; the bottom base is provided with a second location column corresponding to the second screw hole; and the adaptor plate is fixedly connected with the second location column through the second screw hole.

6. The small-spacing LED screen according to claim 1, characterized in that four small modules are available, mutually jointed; and four groups of connecting holes are arranged in an array.

7. The small-spacing LED screen according to claim 1, characterized in that the bottom base is also provided with a magnet base.

* * * * *